（12） United States Patent
Kelly et al.

(10) Patent No.: US 6,430,135 B1
(45) Date of Patent: Aug. 6, 2002

(54) RECORDING/REPRODUCTION AND/OR EDITING OF REAL TIME INFORMATION ON/FROM A DISC LIKE RECORD CARRIER

(75) Inventors: Declan P. Kelly; Steven B. Luitjens; Ronald W. J. J. Saeijs, all of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/424,269
(22) PCT Filed: Mar. 16, 1999
(86) PCT No.: PCT/IB99/00439
§ 371 (c)(1),
(2), (4) Date: Nov. 19, 1999
(87) PCT Pub. No.: WO99/48096
PCT Pub. Date: Sep. 23, 1999

(30) Foreign Application Priority Data

Mar. 19, 1998 (EP) ............................................. 98200888

(51) Int. Cl.$^7$ ................................................. G11B 27/00
(52) U.S. Cl. ..................... 369/83; 369/47.13; 369/47.15
(58) Field of Search ........................... 369/30.05, 30.19, 369/47.13, 47.15, 53.2, 53.24, 53.31, 53.44, 59.1, 59.26, 83; 360/13

(56) References Cited

U.S. PATENT DOCUMENTS 5,579,183 A   11/1996   Van Gestel et al.

*Primary Examiner*—Paul W. Huber
(74) *Attorney, Agent, or Firm*—Micahel E. Belk

(57) ABSTRACT

The size of the blocks of information recorded in fixed-sized fragment areas on a record carrier are controlled to enable simultaneous reading and writing of real-time information, such as a digital video signal, from/onto a disc-like record carrier. Also, one or more bridging blocks are recorded in the fixed-size fragment areas on the record carrier to enable reproduction and seamless editing.

43 Claims, 14 Drawing Sheets

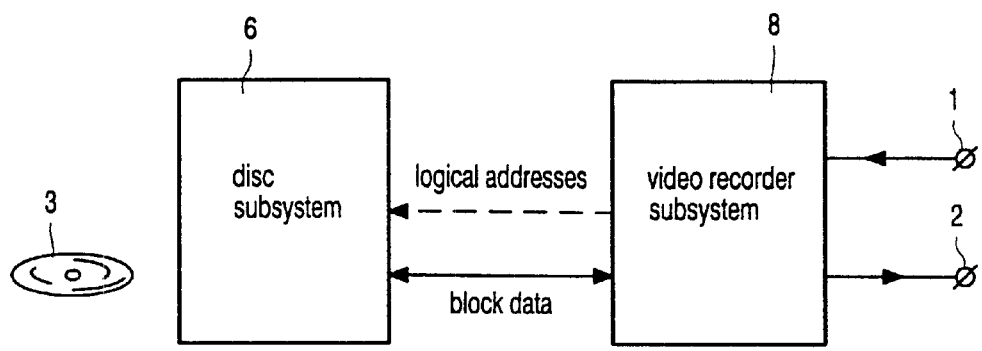
FIG. 1
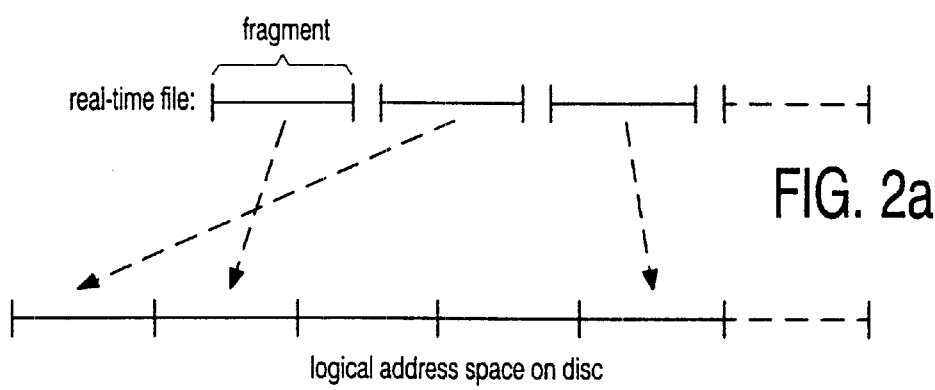
FIG. 2a
FIG. 2b
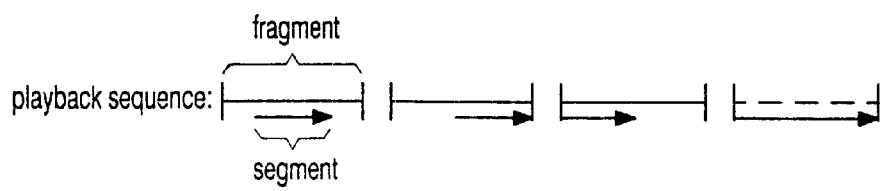
FIG. 3

RECORDING/REPRODUCTION AND/OR EDITING OF REAL TIME INFORMATION ON/FROM A DISC LIKE RECORD CARRIER

This application is a 371 of PCT/IB99/00439, filed Mar. 16, 1999.

FIELD OF THE INVENTION

The invention is related to a field of recording/reproducing and editing real-time information using a disc-like record carrier.

BACKGROUND OF THE INVENTION

The invention relates to an apparatus for recording a real time information signal, such as a digital video signal, on a disc like record carrier, to an apparatus for editing an information signal recorded earlier on the disc like record carrier, to corresponding methods for recording/editing information, and to a reading apparatus for reading the information signal and to a record carrier. The record carrier may be of the magnetic or the optical type. An apparatus for recording a real time information signal, such as an MPEG encoded video information signal, on a record carrier is known from U.S. Pat. No. 5,579,183 (PHN 14818). The record carrier in that document is in longitudinal form.

Disc like record carriers have the advantage of a short access time. This enables the possibility of carrying out 'simultaneous' recording and reproduction of information signals on/from the record carrier. During recording and reproduction, information should be recorded on/reproduced from the record carrier such that an real time information signal can be recorded on the record carrier and 'at the same time' a real time information signal recorded earlier on the record carrier can be reproduced without any interruption.

The above references are hereby incorporated herein in whole by reference.

SUMMARY OF THE INVENTION

The invention aims at providing measures to enable the various requirements, such as the ones described above. In accordance with the invention, the apparatus for recording a real time information signal, such as a digital video signal, on a disc like record carrier, a data recording portion of which is subdivided into fixed sized fragment areas, includes:

input apparatus for receiving the information signal, signal processing apparatus for processing the information signal into a channel signal for recording the channel signal on the disc like record carrier, writing apparatus for writing the channel signal on the record carrier, the signal processing apparatus being adapted to convert the information signal into blocks of information of the channel signal, the writing being adapted to write a block of information of the channel signal in a fragment area on the record carrier, and wherein the signal processing is further adapted to convert the information signal into the blocks of information of the channel signal, such that the size of the blocks of information can be variable and satisfies the following relationship:

$SFA/2 \leq$ size of a block of the channel signal $\leq SFA$, where SFA equals the fixed size of the fragment area.

Further, the apparatus for editing a real time information signal, such as a digital video signal, recorded in an earlier recording step on a disc like record carrier, a data recording portion of which is subdivided into fixed sized fragment areas, the information signal being converted into a channel signal prior to recording and subsequently recorded on the record carrier, such that blocks of information of the channel signal are recorded in corresponding fragment areas on the record carrier, includes:

input apparatus for receiving an exit position in a first information signal recorded on the record carrier and for receiving an entry position in a second information signal, which may be the first information signal, recorded on the record carrier, apparatus for storing information relating to the said exit and entry position, bridging block generating apparatus for generating at least one bridging block of information, which bridging block of information includes information from at least one of the first and second information signals, which information is located before the exit position in the first information signal and/or after the entry position in the second information signal, and where the size of a bridging block of information can be variable and satisfies the requirement:

$SFA/2 \leq$ size of a bridging block of information $\leq SFA$, where SFA equals the fixed size of the fragment areas, writing apparatus for writing the at least one bridging block of information into a corresponding fragment area, and apparatus for reproducing the edited stream of information from said record carrier.

Further, the apparatus for reading a real time information signal, such as a digital video signal, from a disc like record carrier, the information signal being recorded in channel encoded form in a data recording portion of the record carrier, the data recording portion being subdivided into fixed size fragment area, blocks of information of the channel encoded information signal being recorded in corresponding fragment areas, the size of the blocks of information can be variable and satisfy the following relationship:

$SFA/2 \leq$ size of a block of information of the channel signal $\leq SFA$, where SFA equals the fixed size of the fragment areas, the apparatus includes:

apparatus for reading the channel signal from the record carrier, signal processing apparatus for processing the blocks of information of variable size and read from the fragment areas into portions of the information signal, apparatus for outputting the information signal.

A further advantageous embodiment is characterized in that the blocks of information of a consecutive sequence satisfy alternately the following relationships:

$SFA/2 \leq$ size of a block of the channel signal $\leq SFA$ and size of a block of the channel signed=$SFA$.

This leads to either a more efficient occupation of space or eases the requirements of an apparatus. Another advantageous embodiment with the same advantages as above is characterized in that the blocks of information of a consecutive sequence satisfy the following relationship:

$2\ SFA/3 \leq$ size of a block of the channel signal $\leq SFA$.

These and other aspects of the invention will be apparent from and elucidated with reference to the embodiments hereafter in the figure description,

BRIEF DESCRIPTION OF THE DRAWING

FIG. 1 shows an embodiment of the apparatus,

FIGS. 2(a) and 2(b) show the recording of blocks of information in fragment areas on the record carrier, FIG. 3 shows the principle of playback of a video information signal.

DETAILED DESCRIPTION OF THE PREFERRED EMBODIMENT

Figure 4:
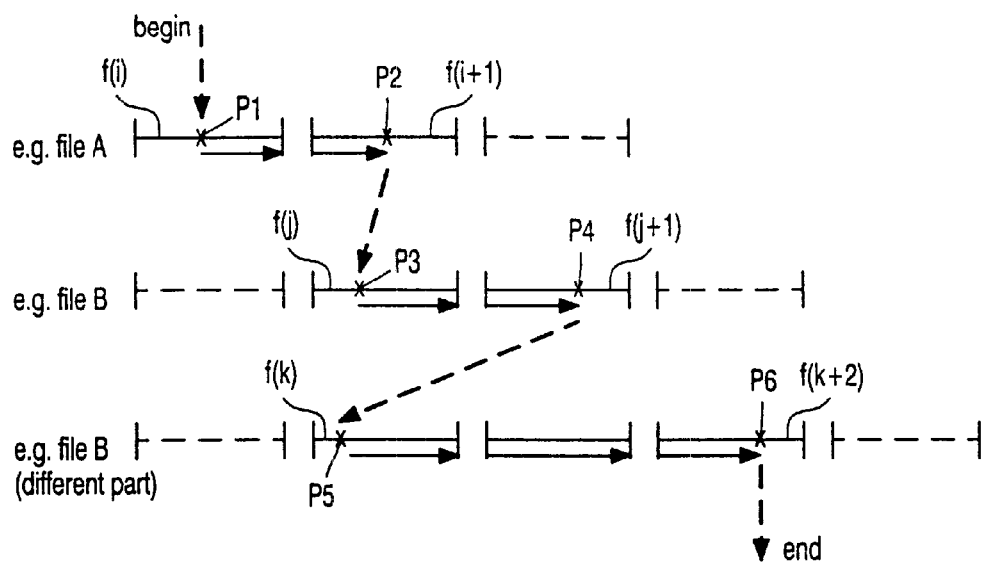
FIG. 4 shows the principle of editing of video information signals.

FIG. 1 shows an embodiment of the apparatus in accordance with the invention. The the following figure description, the attention will be focussed on the recording, reproduction and editing of a video information signal. It should however be noted that other types of signal could equally well be processed, such as audio signals, or data signals.

The apparatus includes an input terminal 1 for receiving a video information signal to be recorded on the disc like record carrier 3. Further, the apparatus includes an output terminal 2 for supplying a video information signal reproduced from the record carrier 3. The record carrier 3 is a disc like record carrier of the magnetic or optical form.

The data area of the disc like record carrier 3 consists of a contiguous range of physical sectors, having corresponding sector addresses. This address space is divided into fragment areas. A fragment area is a contiguous sequence of sectors, with a fixed length. Preferably, this length corresponds to an integer number of ECC-blocks included in the video information signal to be recorded.

The apparatus shown in FIG. 1 is shown decomposed into two major system parts, namely the disc subsystem 6 and the what is called 'video recorder subsystem' 8. The following features characterise the two subsystems:

The disc subsystem can be addressed transparently in terms of logical addresses. It handles defect management (involving the mapping of logical addresses onto physical addresses) autonomously.

For real-time data, the disc subsystem is addressed on a fragment-related basis. For data addressed in this manner the disc subsystem can guarantee a maximum sustainable bit rate for reading and/or writing. In the case of simultaneous reading and writing, the disc subsystem handles the read/write scheduling and the associated buffering of stream data from the independent read and write channels.

For non-real-time data, the disc subsystem may be addressed on a sector basis. For data addressed in this manner the disc subsystem cannot guarantee any sustainable bit rate for reading or writing.

The video recorder subsystem takes care of the video application, as well as file system management. Hence, the disc subsystem does not interpret any of the data that is recorded in the data area of the disc.

In order to realize real time reproduction in all situations, the fragment areas introduced earlier need to have a specific size. Also in a situation where simultaneous recording and reproduction takes place, reproduction should be uninterrupted. In the present example, the fragment size is chosen to satisfy the following requirement:

$$\text{fragment size} = 4 \text{ MB} = 2^{22} \text{ bytes}$$

Recording of a video information signal will briefly be discussed hereafter, with reference to FIG. 2. In the video recorder subsystem, the video information signal, which is a real time signal, is converted into a real time file, as shown in FIG. 2a. A real-time file consists of a sequence of signal blocks of information recorded in corresponding fragment areas. There is no constraint on the location of the fragment areas on the disc and, hence, any two consecutive fragment areas including portions of information of the information signal recorded may be anywhere in the logical address space, as shown in FIG. 2b. Within each fragment area, real-time data is allocated contiguously. Each real-time file represents a single AV stream. The data of the AV stream is obtained by concatenating the fragment data in the order of the file sequence.

Next, playback of a video information signal recorded on the record carrier will be briefly discussed hereafter, with reference to FIG. 3. Playback of a video information signal recorded on the record carrier is controlled by means of a what is called 'playback-control-program' (PBC program). In general, each PBC program defines a (new) playback sequence. This is a sequence of fragment areas with, for each fragment area, a specification of a data segment that has to be read from that fragment. Reference is made in this respect to FIG. 3, where playback is shown of only a portion of the first three fragment areas in the sequence of fragment areas in FIG. 3. A segment may be a complete fragment area, but in general it will be just a part of the fragment area. (The latter usually occurs around the transition from some part of an original recording to the next part of the same or another recording, as a result of editing.)

Note, that simple linear playback of an original recording can be considered as a special case of a PBC program: in this case the playback sequence is defined as the sequence of fragment areas in the real-time file, where each segment is a complete fragment area except, probably, for the segment in the last fragment area of the file. For the fragment areas in a playback sequence, there is no constraint on the location of the fragment areas and, hence, any two consecutive fragment areas may be anywhere in the logical address space.

Next, editing of one or more video information signals recorded on the record carrier will be briefly discussed hereafter, with reference to FIG. 4. FIG. 4 shows two video information signals recorded earlier on the record carrier 3, indicated by two sequences of fragments named 'file A' and 'file B'. For realizing an edited version of one or more video information signals recorded earlier, a new PBC program should be realized for defining the edited AV sequence. This new PBC program thus defines a new AV sequence obtained by concatenating parts from earlier AV recordings in a new order. The parts may be from the same recording or from different recordings. En order to play back a PBC program, data from various parts of (one or more) real-time files has to be delivered to a decoder. This implies a new data stream that is obtained by concatenating parts of the streams represented by each real-time file. In the FIG. 4, this is illustrated for a PBC program that uses three parts, one from the file A and two from the file B.

FIG. 4 shows that the edited version starts at a point $P_1$ in the fragment area f(i) in the sequence of fragment areas of figure A and continues until point $P_2$ in the new fragment area f(i+1) of file A. Then reproduction jumps over to the point $P_3$ in the fragment area f(j) in file B and continues until point $P_4$ in fragment area f(j+2) in file B. Next reproduction jumps over to the point $P_5$ in the same file B, which may be a point earlier in the sequence of fragment areas of file B than the point $P_3$, or a point later in the sequence than the point $P_4$.

Next, a condition for seamless playback during simultaneous recording will be discussed. In general, seamless playback of PBC programs can only be realized under certain conditions. The most severe condition is required to guarantee seamless playback while simultaneous recording is performed. One simple condition for this purpose will be introduced. It is a constraint on the length of the data segments that occur in the playback sequences, as follows: In order to guarantee seamless simultaneous play of a PBC program, the playback sequence defined by the PBC program shall be such that the segment length in all fragments (except the first and the last fragment area) shall satisfy:

$$2 \text{ MB} \leq \text{segment length} \leq 4 \text{ MB}$$

The use of fragment areas allows one to consider worst-case performance requirements in terms of fragment areas and segments (the signal blocks stored in the fragment ares) only, as will be described hereafter. This is based on the fact that single logical fragments areas, and hence data segments within fragment areas, are guaranteed to be physically contiguous on the disc, even after remapping because of defects. Between fragment areas, however, there is no such guarantee: logically consecutive fragment areas may be arbitrarily far away on the disc. As a result of this, the analysis of performance requirements concentrates on the following:

a. For playback, a data stream is considered that is read from a sequence of segments on the disc. Each segment is contiguous and has an arbitrary length between 2 MB and 4 MB, but the segments have arbitrary locations on the disc.

b. For recording, a data stream is considered that is to be written into a sequence of 4 MB fragment areas on the disc. The fragment areas have arbitrary locations on the disc.

Note that for playback, the segment length is flexible. This corresponds to the segment condition for seamless play during simultaneous record. For record, however, complete segments areas with fixed length are written.

Given a data stream for record and playback, we will concentrate on the disc subsystem during simultaneous record and playback. It is assumed that the video recorder subsystem delivers a sequence of segment addresses for both the record and the playback stream well in advance. For simultaneous recording and playback, the disc subsystem has to be able to interleave read and write actions such that the record and playback channels can guarantee sustained performance at the peak rate without buffer overflow or underflow. In general, different R/W scheduling algorithms may be used to achieve this. There are, however, strong reasons to do scheduling in such a way that the R/W cycle time at peak rates is as short as possible:

Shorter cycle times imply smaller buffer sizes for the read and write buffer, and hence for the total memory in the disc subsystem.

Shorter cycle times imply shorter response times to user actions. As an example of response time consider a situation where the user is doing simultaneous recording and playback and suddenly wants to start playback from a new position. In order to keep the overall apparatus response time (visible to the user on his screen) as short as possible, it is important that the disc subsystem is able to start delivering stream data from the new position as soon as possible. Of course, this must be done in such a way that, once delivery has started, seamless playback at peak rate is guaranteed. Also, writing must continue uninterruptedly with guaranteed performance.

Figure 5:
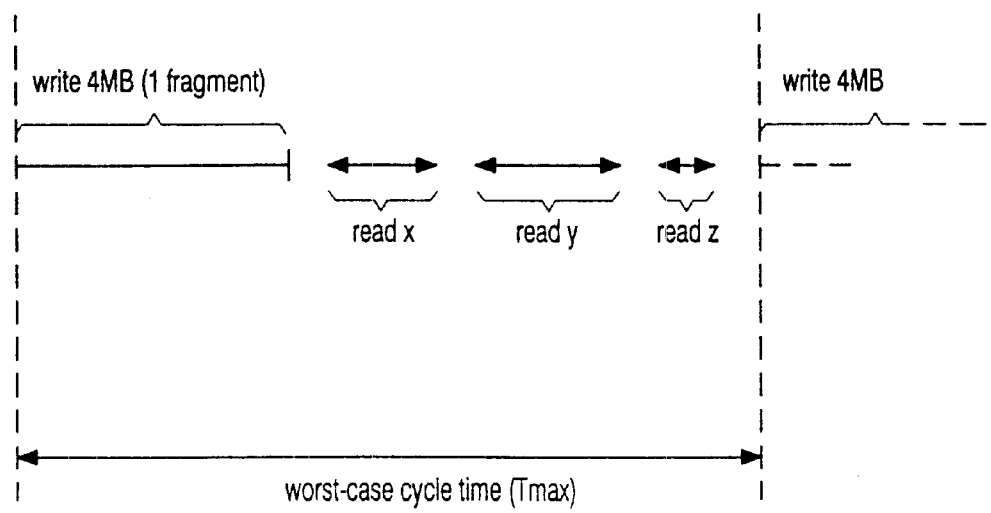
FIG. 5 shows the principle of 'simultaneous' play back and recording.

For the analysis here, a scheduling approach is assumed, based on a cycle in which one complete fragment area is written. For the analysis of drive parameters below, it is sufficient to consider the minimum cycle time under worst-case conditions. Such a worst-case cycle consists of a writing interval in which a 4 MB segment is written, and a reading interval in which at least 4 MB is read, divided over one or more segments. The cycle includes at least two jumps (to and from the writing location), and possibly more, because the segment lengths for reading are flexible and may be smaller than 4 MB. This may result in additional jumps from one read segment location to another. However, since read segments are no smaller than 2 MB, no more than two additional jumps are needed to collect a total of 4 MB. So, a worst-case R/W cycle has a total of four jumps, as illustrated in FIG. 5. In this figure, x denotes the last part of a read segment, y denoted a complete read segment, with length between 2 MB and 4 MB, and z denotes the first part of a read segment and the total size of x, y and z is again 4 MB in the present example.

In general, the required drive parameters to achieve a guaranteed performance for simultaneous recording and playback depend on major design decisions such as the rotational mode etc. These decisions in turn depend on the media characteristics.

The above formulated conditions for seamless play during simultaneous record are derived such that they can be met by different designs with realistic parameters. In order to show this, we discuss the example of a CLV (constant linear velocity) drive design here.

In the case of a CLV design, transfer rates for reading and writing are the same and independent of the physical location on the disc. Therefore, the worst-case cycle described above can be analyzed in terms of just two drive parameters: the transfer rate R and the worst-case all-in access time $\tau$. The worst-case access time $\tau$ is the maximum time between the end of data transfer on one location and the begin of data transfer on another location, for any pair of locations in the data area of the disc. This time covers speed-up/down of the disc, rotational latency, possible retries etc., but not processing delays etc.

For the worst-case cycle described in the previous section, all jumps may be worst-case jumps of duration $\tau$. This gives the following expression for the worst-case cycle time:

$$T\max = 2F/R_r + 4.\tau$$

where F is the fragment size: $F = 4 \text{ MB} = 33.6 \cdot 10^6$ bits.

In order to guarantee sustainable performance at peak user rate R, the following should hold:

$$F \geq R.T\max$$

This yields:

$$R \leq F/T_{max} = R_r.F/2.(F + 2R_r.\tau)$$

As an example, with $R_r = 35$ Mbps and $\tau = 500$ ms, we would have: $R \leq 8.57$ Mbps.

Next, editing will be further described. Creating a new PBC program or editing an existing PBC program, generally results in a new playback sequence. It is the objective to guarantee that the result is seamlessly playable under all circumstances, even during simultaneous recording. A series of examples will be discussed, where it is assumed that the intention of the user is to make a new AV stream out of one or two existing AV streams. The examples will be discussed in terms of two streams A and B, where the intention of the user is to make a transition from A to B. This is illustrated in FIG. 6, where a is the intended exit point from stream A and where b is the intended entry point into stream B.

Figure 6A:
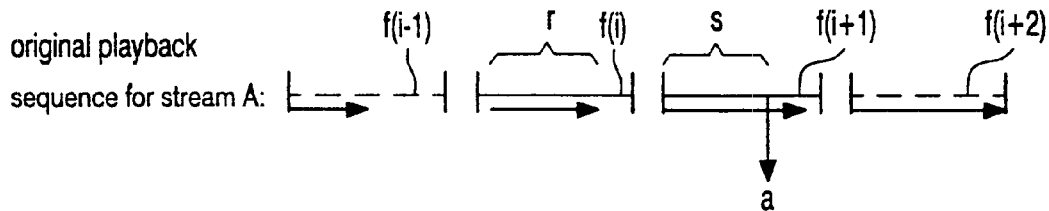
FIGS. 6(a) and 6(b) show a situation during editing when the generation and recording of a bridging block of information is not required.
Figure 6B:
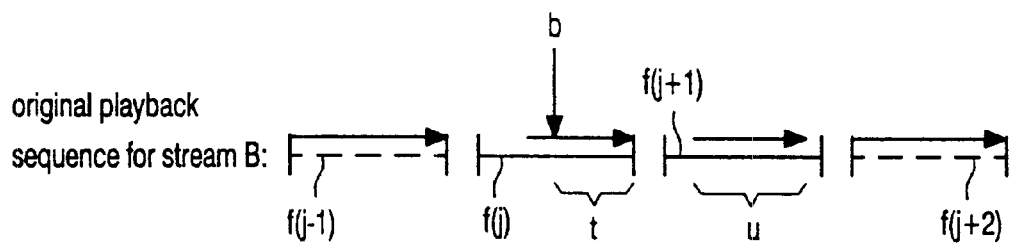

FIG. 6a shows the sequence of fragment areas . . . , f(i−1), f(i), f(i+1), f(i+2), . . . of the stream A and FIG. 6b shows the sequence of fragment areas . . . , f(j−1), f(j), f(j+1), f(j+2), . . . of the stream B. The edited video information signal consists of the portion of the stream A preceding the exit point a in fragment area f(i+1), and the portion of the stream B starting from the entry point b in fragment area f(j).

This is a general case that covers all cut-and-paste-like editing, including appending two streams etc. It also covers the special case where A and B are equal. Depending on the relative position of a and b, this special case corresponds to PBC effects like skipping part of a stream or repeating part of a stream.

The discussion of the examples focuses on achieving seamless playability during simultaneous recording. The condition for seamless playability is the segment length condition on the length of the signal blocks of information stored in the fragment areas, that was discussed earlier. It will be shown below that, if streams A and B satisfy the segment length condition, then a new stream can be defined such that it also satisfies the segment length condition. Thus, seamlessly playable streams can be edited into new seamlessly playable streams. Since original recordings are seamlessly playable by construction, this implies that any edited stream will be seamlessly playable. As a result, arbitrarily editing earlier edited streams is also possible. Therefore streams A and B in the discussion need not be original recordings: they can be arbitrary results of earlier virtual editing steps.

In a first example, a simplified assumption will be made about the AV encoding format and the choice of the exit and entry points. It is assumed that the points a and b are such that, from the AV encoding format point of view, it would be possible to make a straightforward transition. In other words, it is assumed that straightforward concatenation of data from stream A (ending at the exit point a) and data from stream B (starting from entry point b) results in a valid stream, as far as the AV encoding format is concerned. The above assumption implies that in principle a new playback sequence can be defined based on the existing segments. However, for seamless playability at the transition from A to B, we have to make sure that all segments satisfy the segment length condition. Let us concentrate on stream A and see how to ensure this. Consider the fragment area of stream A that contains the exit point a. Let s be the segment in this fragment area that ends at point a, see FIG. 6a.

If 1(s), the length of s, is at least 2 MB, then we can use this segment in the new playback sequence and point a is the exit point that should be stored in the PBC program.

Figure 7A:
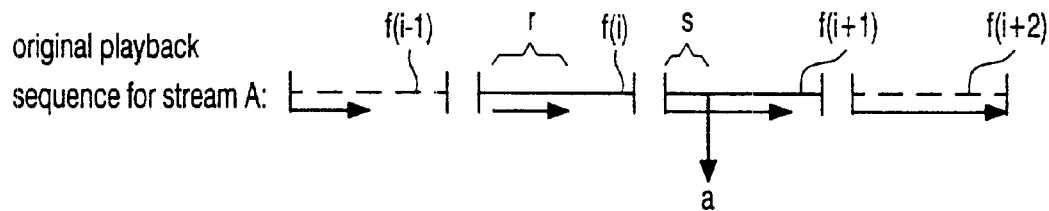
FIGS. 7(a) and 7(b) show an example of the editing of a video information signal and the generation of a bridging block of information, at the location of an exit point from the information signal.
Figure 7B:
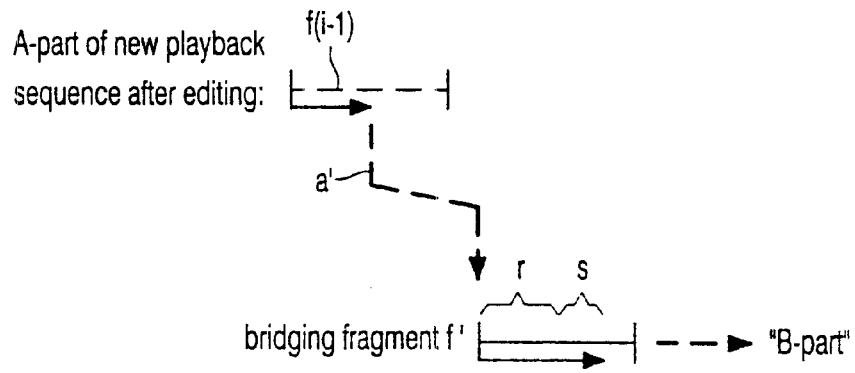

However, if 1(s) is less than 2 MB, then the resulting segment s does not satisfy the segment length condition. This is shown in FIG. 7. In this case a new fragment area, the so-called bridging fragment area f is created. In this fragment area, a bridging segment including a copy of s preceded by a copy of some preceding data in stream A, is stored. For this, consider the original segment r that preceded s in stream A, shown in FIG. 7a. Now, depending on the length of r, the segment stored in fragment area f(i), either all or part of r is copied into the new fragment area f:

If $1(r) + 1(s) \leq 4$ MB, then all of r is copied into f, and the original segment r is not used in the new playback sequence, as illustrated in FIG. 7a. More specifically, the new exit point is the point denoted a', and this new exit point a' is stored in the PBC program, and later on, after having terminated the editing step, recorded on the disc like record carrier. Thus, in response to this PBC program, during playback of the edited video information stream, after having read the information stored in the fragment area f(i−1), the program jumps to the bridging fragment area f', for reproducing the information stored in the bridging fragment area f', and next jumps to the entry point in the video stream B to reproduce the portion of the B stream, as schematically shown in FIG. 7b.

If $1(r) + 1(s) > 4$ MB, then some part p from the end of r is copied into f', where the length of p is such that we have $$2 \text{ MB} \leq 1(r) - 1(p) \leq 4 \text{ MB } 2 \text{ MB} \leq 1(p) + 1(s) \leq 4 \text{ MB}$$

Figure 8A:
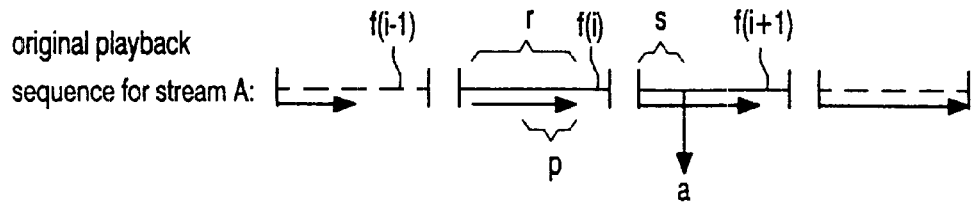
FIGS. 8(a) and 8(b) show another example of the editing of a video information signal and the generation of a bridging block of information, at the same location of the exit point as in FIG. 7, FIGS. 9(a) and 9(b) show an example of the editing of a video information signal and the generation of a bridging block of information, at the location of an entry point to the information signal.
Figure 8B:
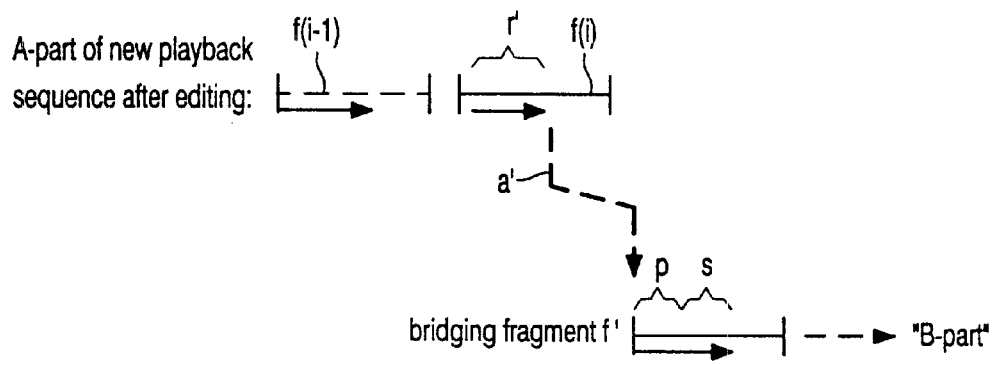

Reference is made to FIG. 8, where FIG. 8a shows the original A stream and FIG. 8b shows the edited stream A with the bridging fragment area f'. In the new playback sequence, only a smaller segment r' in the fragment area f(i) containing r is now used. This new segment r' is a subsegment of r, viz. the first part of r with length $1(r') = 1(r) - 1(p)$. Further, a new exit point a' is required, indicating the position where the original stream A should be left, for a jump to the bridging fragment f'. This new exit position should therefore be stored in the PBC program, and stored later on on the disc.

Figure 9A:
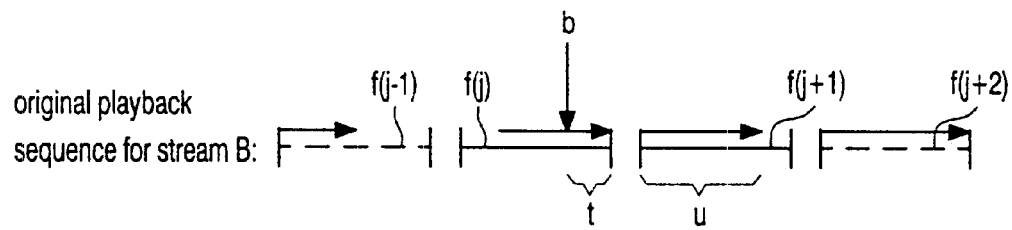
Figure 9B:
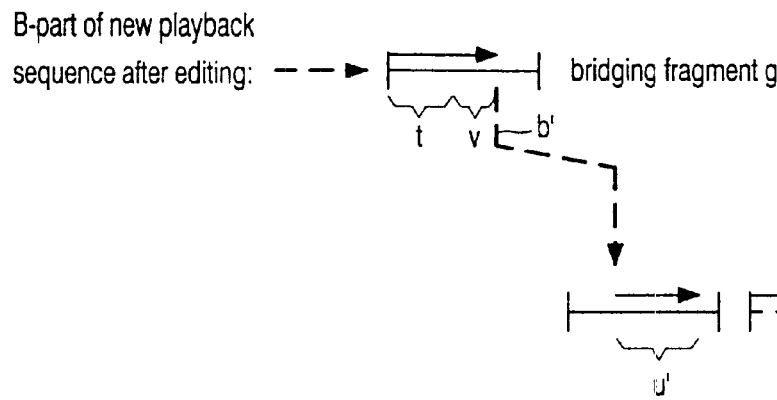

In the example given above, it was discussed how to create a bridging segment (or: bridging block of information) for the fragment area f', in case the last segment in stream A (i.e. s) becomes too short. We will now concentrate on stream B. In stream B, there is a similar situation for the segment that contains the entry point b, see FIG. 9. FIG. 9a shows the original stream B and FIG. 9b shows the edited stream. Let t be the segment comprising the entry point b. If t becomes too short, a bridging segment g can be created for storage in a corresponding bridging fragment area. Analogous to the situation for the bridging fragment area f', g will consist of a copy of t plus a copy of some more data from stream B. This data is taken from the original segment u that succeeds t in the fragment area f(j+1) in the stream B. Depending on the length of u, either all or a part of u is copied into g. This is analogous to the situation for r described in the earlier example. We will not describe the different cases in detail here, but FIG. 9b gives the idea by illustrating the analogy of FIG. 8, where u is split into v and u'. This results in a new entry point b' in the B stream, to be stored in the PBC program and, later on, on the record carrier.

Figure 10:
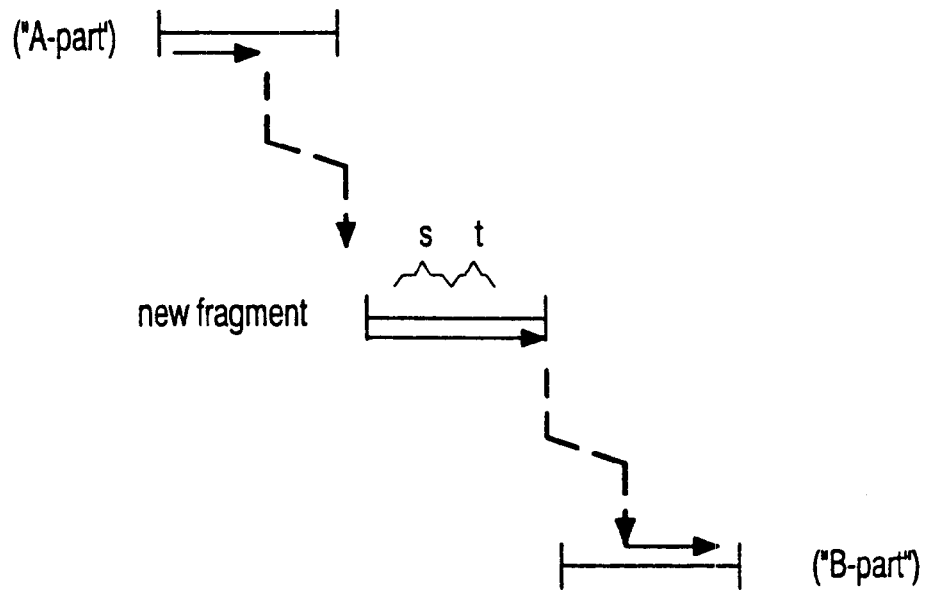
FIG. 10 shows an example of the editing of two information signals and the generation of a bridging block of information.

The next example, described with reference to FIG. 10, shows how a new seamlessly playable sequence can be defined under all circumstances, by creating at most two bridging fragments (f' and g). It can be shown that, in fact, one bridging fragment area is sufficient, even if both s and t are too short. This is achieved if both s and t are copied into a single bridging fragment area (and, if necessary, some preceding data from stream A and/or some succeeding data from stream B). This will not be described extensively here, but FIG. 10 shows the general result.

Figure 11:
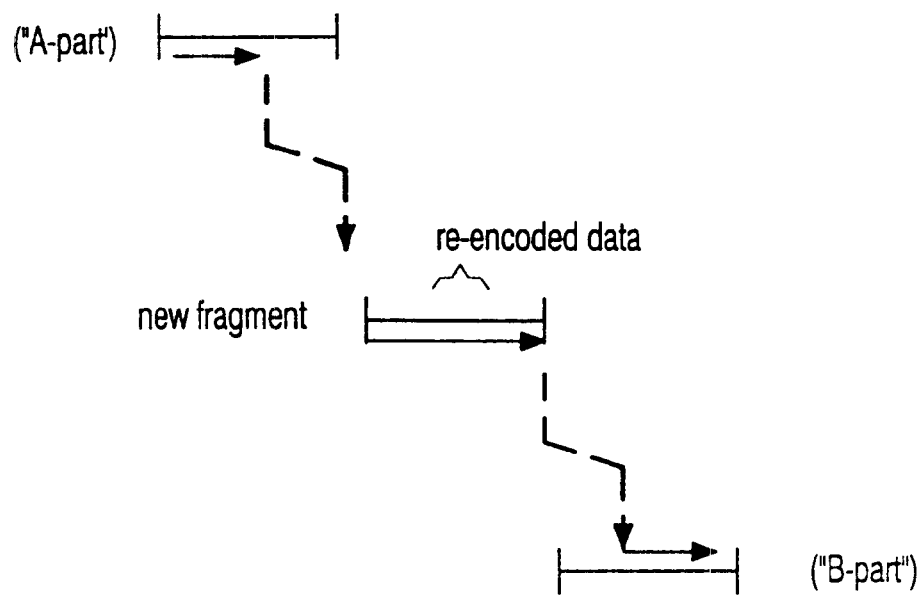
FIG. 11 shows an example of the editing of two information signals and the generation of a bridging block of information, where the editing includes re-encoding some of the information of the two information signals.

In examples described above, it was assumed that concatenation of stream data at the exit and entry points a and b was sufficient to create a valid AV stream. In general, however, some re-encoding has to be done in order to create a valid AV stream. This is usually the case if the exit and entry points are not at GOP boundaries, when the encoded video information signal is an MPEG encoded video information signal. The re-encoding will not be discussed here, but the general result will be that some bridge sequence is needed to go from stream A to stream B. As a consequence, there will be a new exit point a' and a new entry point b', and the bridge sequence will contain re-encoded data that corresponds with the original pictures from a' to a followed by the original pictures from b to b'. Not all the cases will be described in detail here, but the overall result is like in the previous examples: there will be one or two bridging fragments to cover the transition from A to B. As opposed to the previous examples, the data in the bridging fragments is now a combination of re-encoded data and some data copied from the original segments. FIG. 11 gives the general flavour of this.

As a final remark, note that one does not have to put any special constraints on the re-encoded data. The re-encoded stream data simply has to satisfy the same bitrate requirements as the original stream data.

Figure 12:
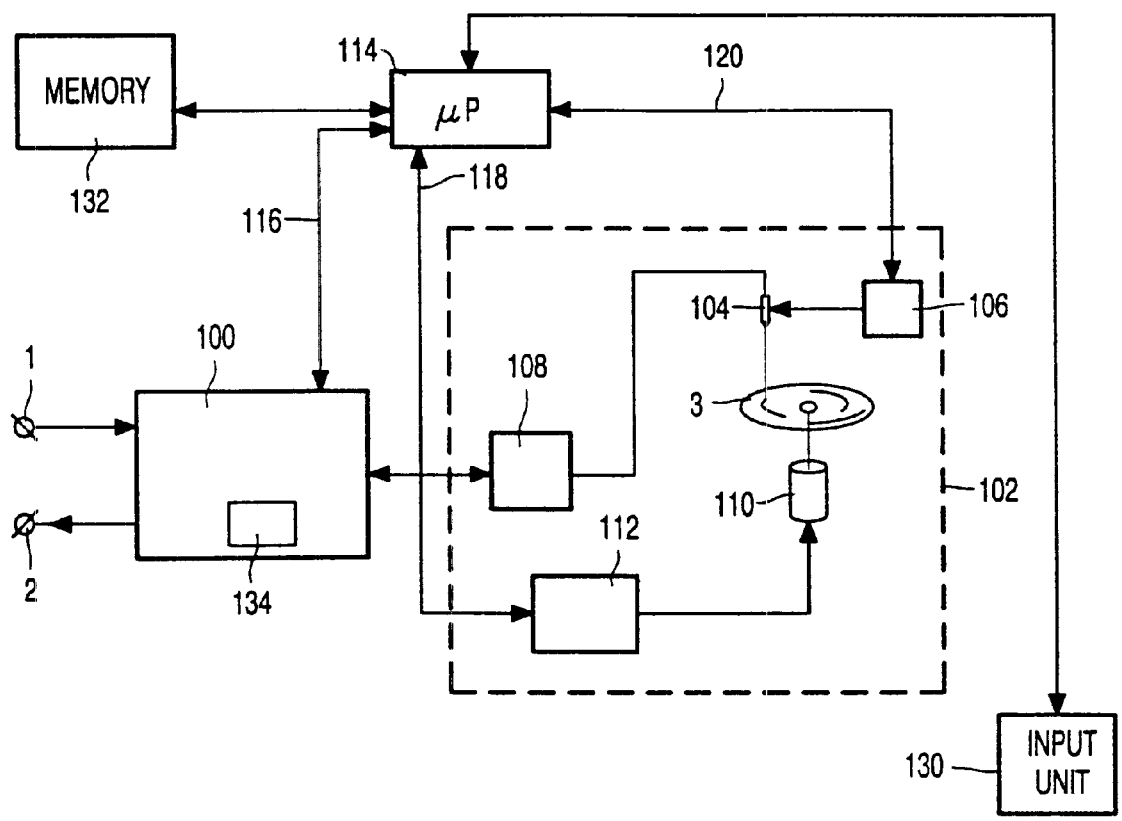
FIG. 12 shows a further elaboration of the apparatus.

FIG. 12 shows a schematic version of the apparatus in more detail. The apparatus includes a signal processing unit 100 which is incorporated in the subsystem 8 of FIG. 1. The signal processing unit 100 receives the video information signal via the input terminal 1 and processes the video information into a channel signal for recording the channel signal on the disc like record carrier 3. Further, a read/write unit 102 is available which is incorporated in the disc subsystem 6. The read/write unit 102 includes a read/write head 104, which is in the present example an optical read/write head for reading/writing the channel signal on/from the record carrier 3. Further, positioning means 106 are present for positioning the head 104 in a radial direction across the record carrier 3. A read/write amplifier 108 is present in order to amplify the signal to be recorded and amplifying the signal read from the record carrier 3. A motor 110 is available for rotating the record carrier 3 in response to a motor control signal supplied by a motor control signal generator unit 112. A microprocessor 114 is present for controlling all the circuits via control lines 116, 118 and 120.

The signal processing unit 110 is adapted to convert the video information received via the input terminal 1 into blocks of information of the channel signal having a specific size. The size of the blocks of information (which is the segment mentioned earlier) can be variable, but the size is such that it satisfies the following relationship:

$$SFA/2 \leq \text{size of a block of the channel signal} \leq SFA,$$

where SFA equals the fixed size of the fragment areas. In the example given above, SFA=4 MB. The write unit 102 is adapted to write a block of information of the channel signal in a fragment area on the record carrier.

In order to enable editing of video information recorded in an earlier recording step on the record carrier 3, the apparatus is further provided with an input unit 130 for receiving an exit position in a first video information signal recorded on the record carrier and for receiving an entry position in a second video information signal recorded on that same record carrier. The second information signal may be the same as the first information signal. Further, the apparatus includes a memory 132, for storing information relating to the said exit and entry positions. Further the apparatus includes a bridging block generating unit 134, incorporated in the signal processing unit 100, for generating at least one bridging block of information (or bridging segment) of a specific size. As explained above, the bridging block of information includes information from at least one of the first and second video information signals, which information is located before the exit position in the first video information signal and/or after the entry position in the second video information signal. During editing, as described above, one or more bridging segments are generated in the unit 134 and in the edit step, the one or more bridging segment(s) is (are) recorded on the record carrier 3 in a corresponding fragment. The size of the at least one bridging block of information also satisfies the relationship:

$$SFA/2 \leq \text{size of a bridging block of information} \leq SFA.$$

Further, the PBC programs obtained in the edit step can be stored in a memory incorporated in the microprocessor 114, or in another memory incorporated in the apparatus. The PBC program created in the edit step for the edited video information signal will be recorded on the record carrier, after the editing step has been terminated. In this way, the edited video information signal can be reproduced by a different reproduction apparatus by retrieving the PBC program from the record carrier and reproducing the edited video information signal using the PBC program corresponding to the edited video information signal.

In this way, an edited version can be obtained, without re-recording portions of the first and/or second video information signal, but simply by generating and recording one or more bridging segments into corresponding (bridging) fragment areas on the record carrier.

Figure 13A:
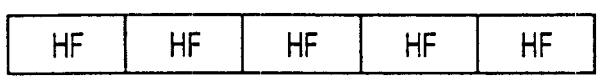
FIGS. 13(a) through 13(c) show sequences of fragments illustrating three embodiments of the invention respectively satisfying the HF condition, the HFFF condition and the 2/3 condition.

In the above described embodiment, fragments are created on the disk that are at least half full. This will be referred to as the HF condition while a fragment is called FF if it is completely full. As shown in the above, after editing a stream that satisfies the HF condition, it is possible to ensure that the resulting stream also satisfies the HF condition. This requires a single fragment to be allocated for the bridge. In the worst case this may result in an AN stream consisting of all half-filled fragments. FIG. 13A schematically illustrates such a sequence of half filled fragments HF. This stream places severe requirements on drive performance.

Figure 13B:
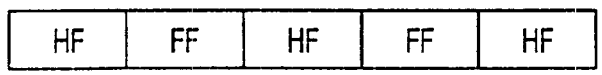
Figure 13C:
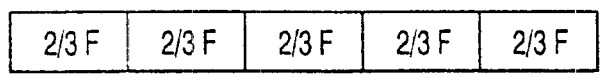

Next a second and third embodiment will be described for recording and editing of video/audio streams on a disk. These embodiments ease the worst case situation with respect to occupation of space that may occur with the first embodiment and which is illustrated in FIG. 13A. The worst case stream of fragments resulting from a second embodiment is shown in FIG. 13B. This stream satisfies a BFFF condition implying that at least every second fragment is fully filled. The worst case stream of fragments resulting from a third embodiment is shown in FIG. 13C. It is remarked that the second and third embodiments also ease the requirements of an apparatus. This stream satisfies a 2/3F condition implying that the minimum fullness of a fragment is greater than 2/3. Although this case will be considered in detail, other values for the fullness are also possible.

Figure 14:
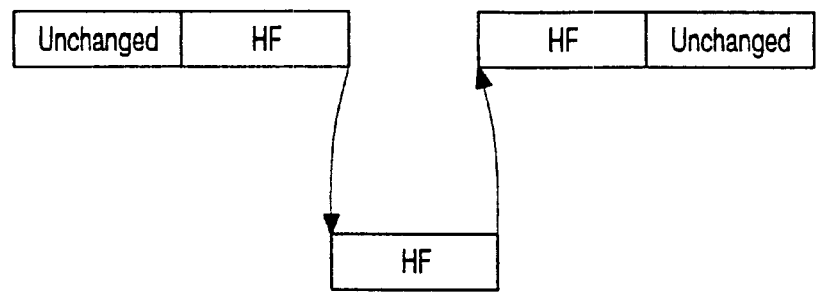
FIG. 14 shows the general case of bridge creation without reallocation.
Figure 15:
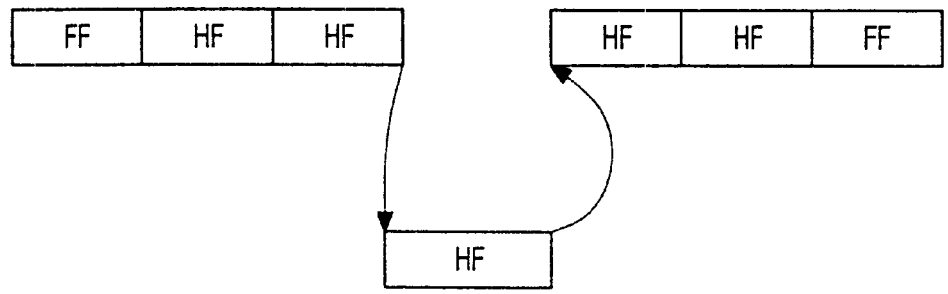
FIG. 15 shows the worst case situation of creating a bridge assuming a HFFF condition, with FIGS. 16–21 illustrating the several allocation strategies in this case

It will be shown that to achieve either of these conditions, more than one fragment may be required for bridges. First bridge creation is considered in case of the first embodiment satisfying the HF condition. FIG. 14 shows the general case of creating a bridge, the details being discussed in detail here before. Note that the fragments before and after the bridge may originally have been full fragments but due to the choice of edit points the result is that they will be partially filled in the edit sequence. The only assumption is that the fragments before the bridge, the bridge fragment and the fragment after the bridge are at least half full. Next will be shown how to create a bridge in case of the second embodiment satisfying the HFFF condition. FIG. 15 shows an edited sequence illustrating the worst case situation in this case. In the original sequences both the last fragment before the bridge and the first fragment after the bridge must be full since it is assumed that the original streams satisfy the FFHF condition. First is tried to preserve the FFHF condition by reallocating the fragment before the bridge, the bridge fragment and the fragment after the bridge (three fragment reallocation). In general the following assumption can be made about the size of these fragments:

$$1.5 \leq \text{size } (3^*HF) \leq 3 \quad [1]$$

where the units are the fragment size. This condition implies the following possibilities for reallocating the three fragments:

$$1.5 < \text{size } (3^*HF) < 2 \quad [2]$$

$$2 \leq \text{size } (3^*HF) \leq 2.5 \quad [3]$$

$$2.5 \leq \text{size } (3^*HF) \leq 3 \quad [4]$$

Figure 16:
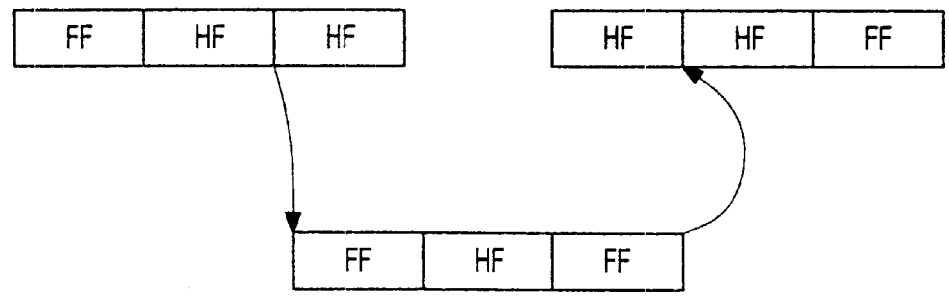

Possibility [1] can be reallocated as FF+HF, [2] as FF+HF+FF and [3] as FF+FF+HF. In the last case, by reallocating the three fragments as FF HF and FF, it is possible to maintain the FFHF condition. However, the result is that the bridge requires three fragments instead of one, as is illustrated in FIG. 16. In the other cases it is not possible to preserve the FFHF condition by reallocating the three fragments.

Therefore, resulting form [1] and [2] the following condition holds:

$$1.5 \leq \text{size } (3^*HF) \leq 2.5 \quad [5]$$

Adding a fourth HF fragment (four fragment reallocation), this condition becomes:

$$2 \leq \text{size } (4^*HF) \leq 3.5 \quad [6]$$

This condition implies the following possibilities for reallocating the four fragments:

$$2 = \text{size } (4^*HF) \quad [7]$$

$$2 < \text{size } (4^*HF) < 2.5 \quad [8]$$

$$2.5 \leq \text{size } (4^*HF) < 3 \quad [9]$$

$$3 < \text{size } (4^*HF) < 3.5 \quad [10]$$

Figure 17:
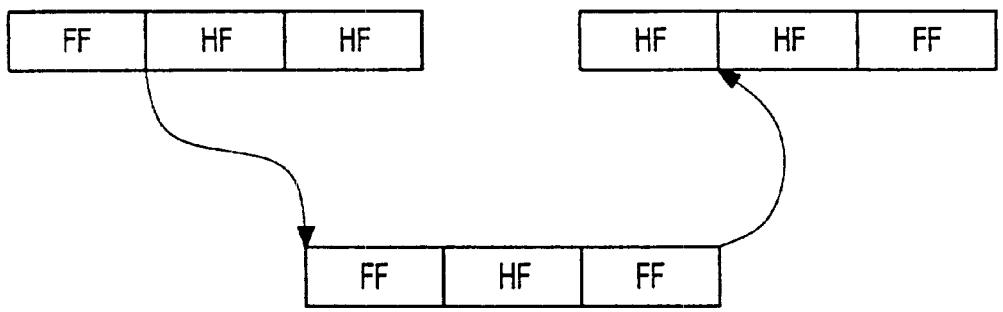
Figure 18A:
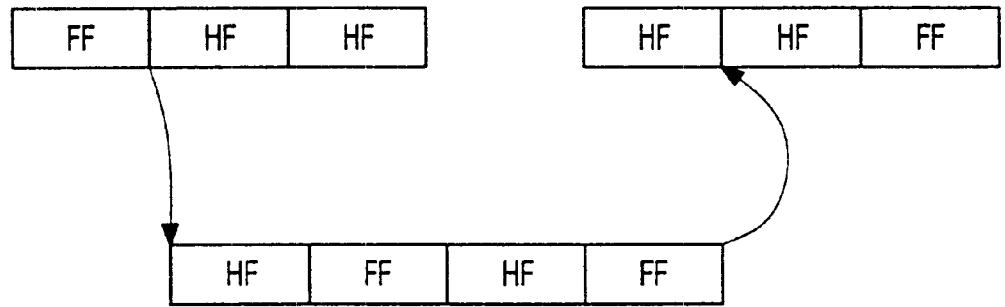
Figure 18B:
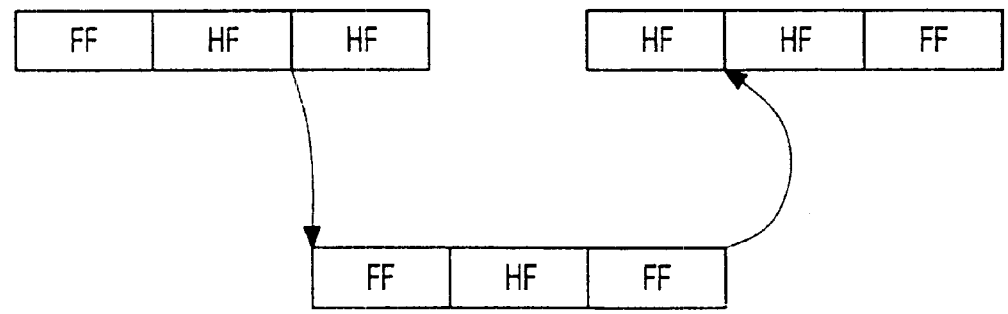

Possibility [7] may be reallocated as FF+HF, [8] as FF+HF+HF, [9] as FF+FF+HF and [10] as FF+FF+HF+HF. In the second case [8] it is not possible to satisfy the FFHF condition. The third case [9] is shown in FIG. 17. The fourth case [8] requires four fragments for the bridge and is shown in FIG. 18. However, possibility [8] implies that the first HF fragment can be made 0.5 and it can still be guaranteed that the FF segments can be filled. But this means that just the first half of the original HF fragment can be taken. This results in a three fragment bridge which is shown in FIG. 18.

Next possibility [8], which was not possible to reallocate, is added a fifth HF fragment:

$$2.5 < \text{size } (5^*HF) < 3.5 \quad [11]$$

This possibility implies the following possibilities for reallocating the five fragments:

$$2.5 < \text{size } (5^*HF) \leq 3 \quad [12]$$

$$3 < \text{size } (4^*HF) \leq 3.5 \quad [13]$$

Figure 19:
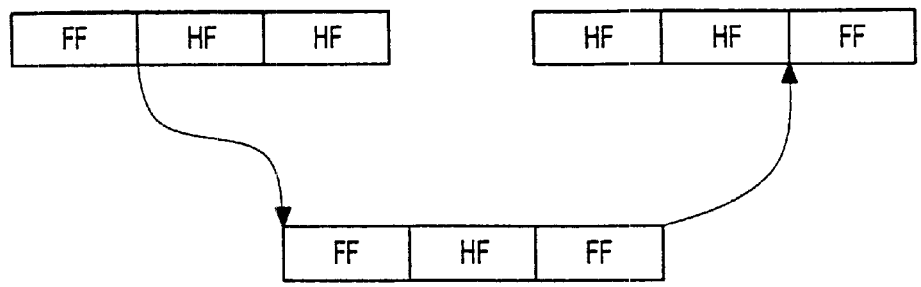
Figure 20:
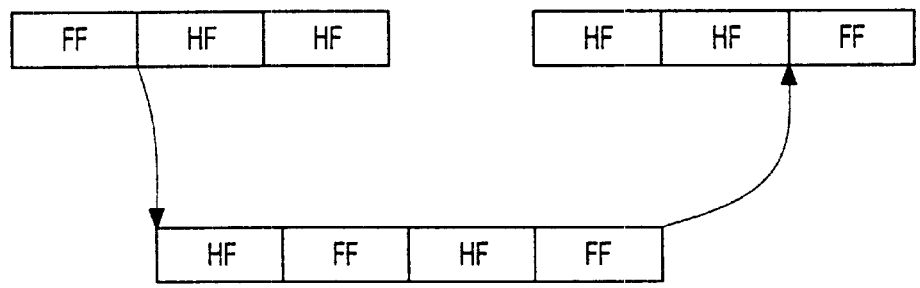
Figure 21:
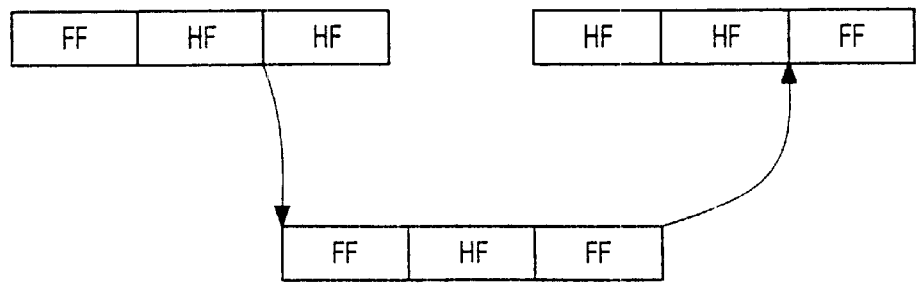
Figure 22:
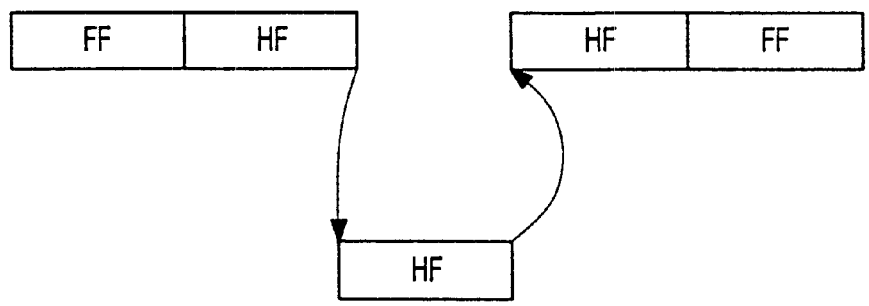
FIG. 22 shows the result of bridge creation without reallocation in a locally FF stream, with FIGS. 23–24(b) illustrating the several allocation strategies in this case.

In either case it is possible to reallocate the five fragments to satisfy the HFFF condition. FIG. 19 shows the first case [12] requiring three fragments while FIG. 20 shows the second case [13] requiring four fragments. However, as in the above, the possibility [13] implies that the first HF fragment can be made 0.5 and it can still be guaranteed that the FF fragments can be filled. But this means that just the first half segment from the original HF fragment can be taken. This results in a three fragment bridge which is shown in FIG. 21. Concluding, it is possible to satisfy the HFFF condition with a worst case bridge of three fragments. Because this condition is weaker than the FF condition, the previous analysis also covers editing of FF streams as well. In most cases the streams being edited will be locally FF unless the user performs a number of very closed edits. The situation when editing from a locally FF stream should be better than the worst case described above. The general case of editing a stream that satisfies the FF condition is shown in FIG. 22. Considering the three HF fragments, the following condition is valid:

$$1.5 \leq \text{size } (3^*HF) \leq 3 \quad [14]$$

This condition implies the following possibilities for reallocating the three fragments:

$$1.5 \leq \text{size } (3^*HF) \leq 2 \quad [15]$$

$$2 \leq \text{size } (3^*HF) \leq 3 \quad [16]$$

Figure 23:
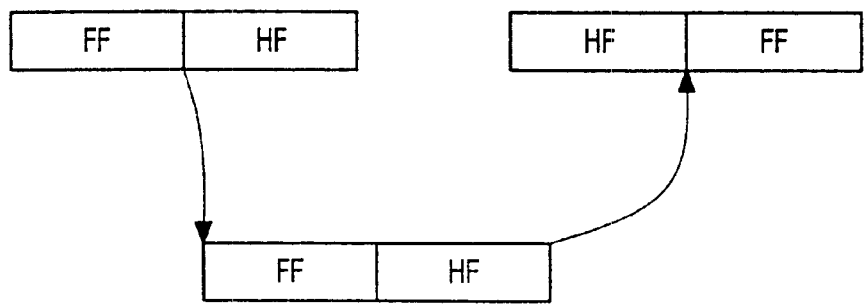
Figure 24A:
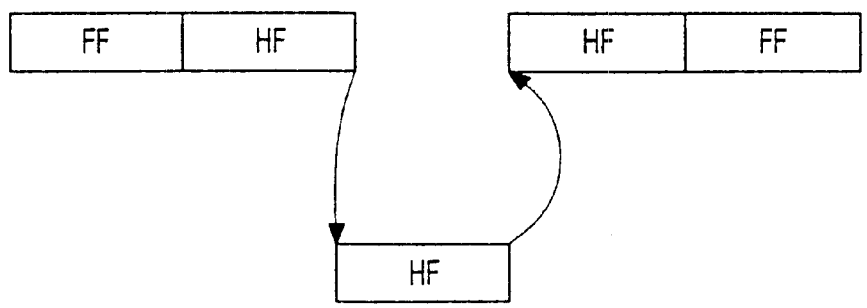
FIG. 24A shows a bridge assuming a 2/3 condition containing only MPEG data, with FIGS. 24B–36 illustrating the several allocation strategies in this case.
Figure 24B:
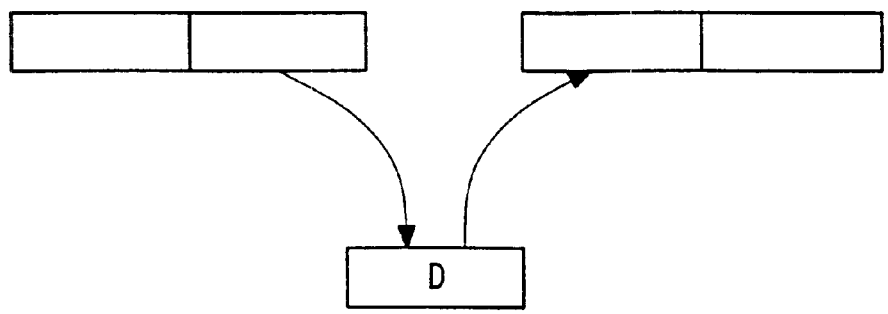

Possibility [15] can be reallocated as FF+HF and [16] as FF+HF+HF. In the first case [15] it is possible to reallocate the three fragments as two fragments as shown in FIG. 23. It is noted that in general it is not possible to use a single FF fragment for the bridge and keep one of the original HF fragments. In the second case [16] it is possible to use a single fragment for the bridge. Data can be copied from the other two fragments until the bridge fragment is FF. This allows the HFFF condition to be satisfied with a single bridge fragment. This is shown in FIG. 24.

Finally it is remarked that a worst case will only occur where the user does a number of close edits. In the normal case, where edits are a few seconds apart, the bridge may require two fragments at most. The above discussion of the second embodiment for a worst case situation, eventually together with the detailed discussion of the first embodiment, enable a man skilled in the art to implement the bridge creation either in software or hardware or a mixture of both software and hardware for all cases.

It is remarked that replacing the HF condition according to the first embodiment with the HFFF condition, will result in longer bridges and so virtual editing requires more disk space than with the HF condition. However, in the case of real editing, where the original stream can be discarded and only the edited stream is kept on disk, the second embodiment will actually save disk space. In a number of cases a group of partially filled fragments will be reallocated into a smaller number of fragments.

Next the third embodiment satisfying the 2/3F condition will be discussed. It is remarked that in general the larger the fullness required for fragments, the more fragments are required for bridge creation. For example, the HF condition could be replaced with one where the minimum fragment fullness was 0.75, that is, each at least partially filled fragment PF satisfies:

$$0.75 \leq \text{size } (PF) \leq 1 \qquad [17]$$

This gives the same worst case average fragment fullness as the FFHF condition of 0.75. To maintain the 0.75 condition requires worst case bridges of four fragments, even when the original stream is FF. Therefore, this option is not as good as the HFFF condition presented above. A 2/3F condition gives a lower worst case average fragment fullness than the HFFF condition and consequently can be expected to require less reallocation than the HFFF condition. FIG. 24 shows the starting point for creating a bridge assuming that the original streams satisfy the 2/3 F condition. Here D represents the MPEG part of the bridge, that is, the part of the streams that must be copied, recoded or remultiplexed to satisfy the MPEG requirements. No assumption can be made about the fullness of the fragment directly preceding the bridge or the fragment directly after the bridge because the fullness of these fragments will depend on the choice of edit points. A number of cases will be considered based on the fullness of the fragments before and after the bridge.

Figure 25:
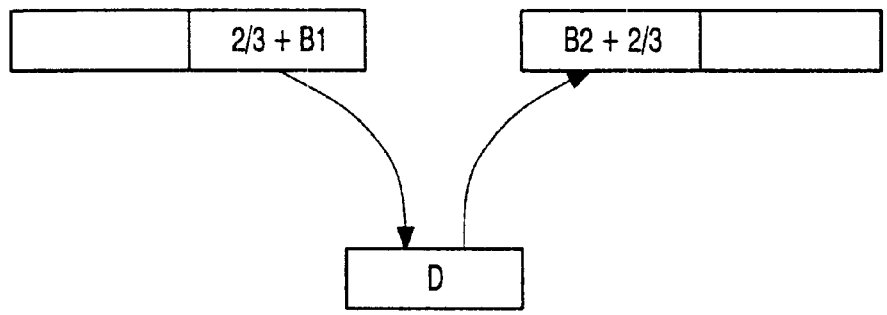

FIG. 25 illustrates case 1. Here both the fragment preceding the bridge and the fragment after the bridge are more than 2/3 full and the bridge contains only the data required to fulfill the MPEG requirements.

Figure 26:
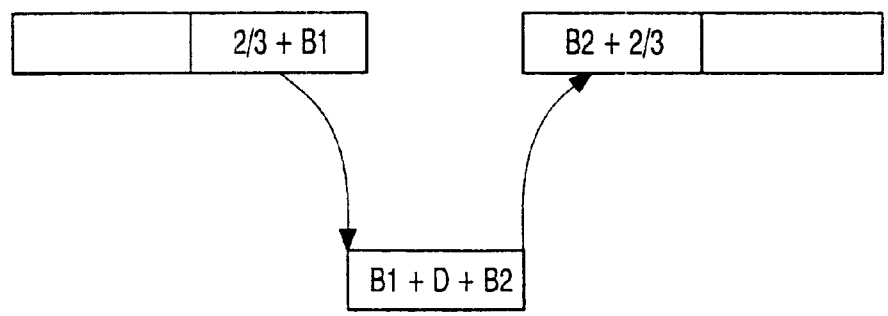

If $$B1+D+B2 \geq 2/3 \qquad [18]$$

then there is no problem and the result is as shown if FIG. 26.

if $$B1+D+B2>1 \qquad [19]$$

then not all of B1 and B2 will be copied.

Figure 27:
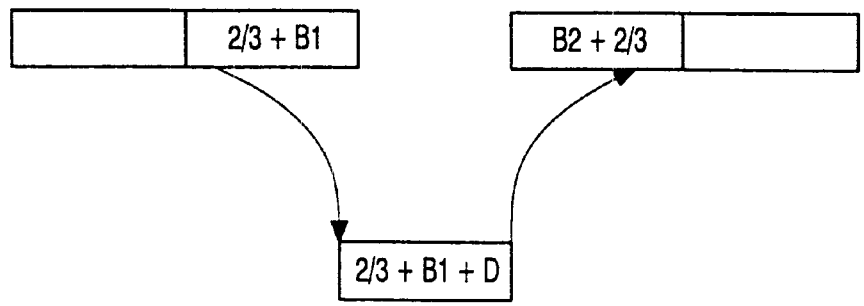
Figure 28:
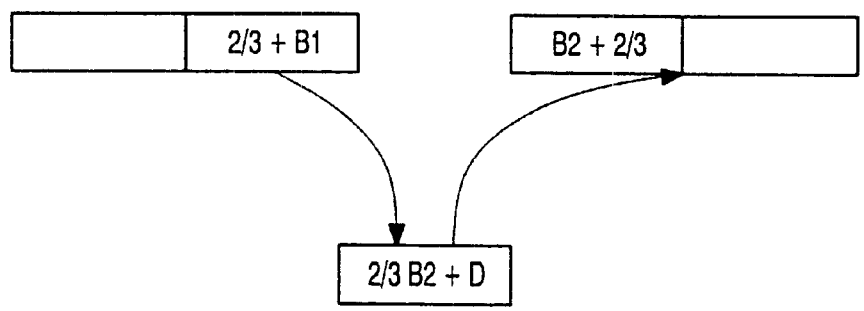

If $$2/3+B1+D \leq 1 \qquad [20]$$

or $$2/3+B2+D \leq 1 \qquad [21]$$

then there is no problem and the result is as shown in FIG. 27 and FIG. 28 respectively.

Assuming that 0<B1+D+B2<2/3 and adding the contents of the other two fragments gives:

$$4/3<2/3+B1+D+B2+2/3<6/3 \qquad [22]$$

Figure 29:
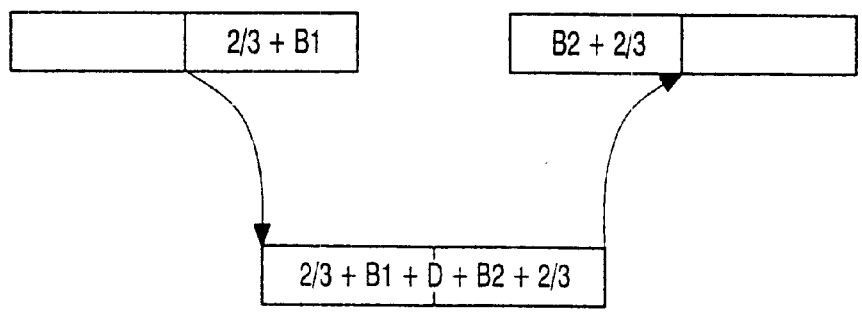

In this case it is possible to reallocate the data in two fragments of at least 2/3 as shown in FIG. 29. When the original stream was locally FF or not, has no effect on the result in this case.

Figure 30:
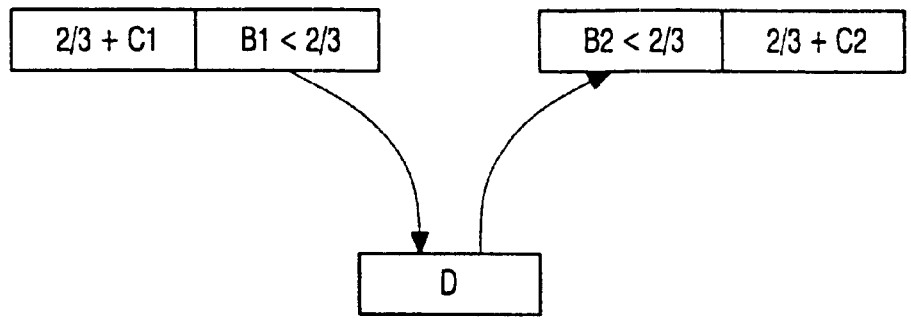
Figure 31:
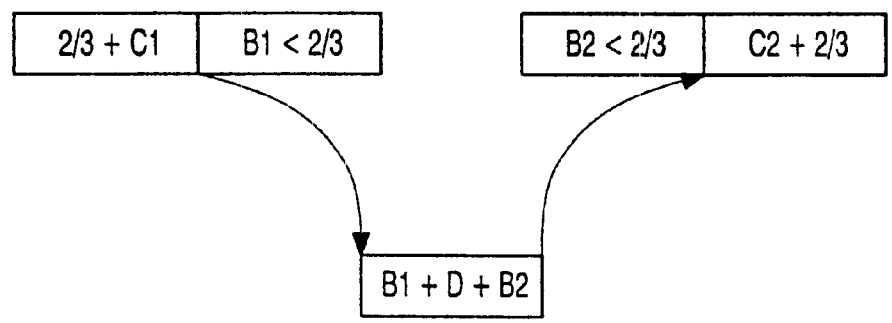

FIG. 30 shows the starting point for case 2. Here both the fragment before the bridge and the fragment after the bridge are less then 2/3 full. If $$2/3 \leq B1+D+B2 \leq 1 \qquad [23]$$

then there is no problem and the results is as shown in FIG. 31. Now there are two situations to consider:

$$B1+D+b2<2/3 \qquad [24]$$

and $$B1+D+B2>1 \qquad [25]$$

First the first situation [24] is discussed. Adding all or part of C1 and C2 to make up the 2/3 fragment still results in a problem if C1+C2 do not yield enough data. This occurs when the following condition holds:

$$C1+B1+D+B2+C2<2/3 \qquad [26]$$

Adding the rest of the previous and next fragments gives:

$$4/3<2/3+C1+B1+D+B2+C2+2/3<6/3 \qquad [27]$$

Figure 32:
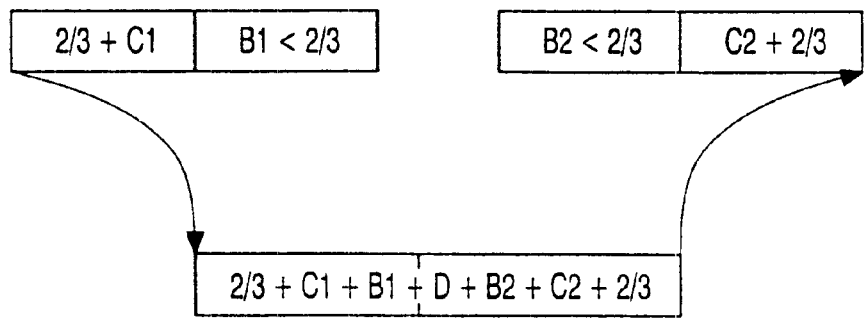
Figure 33:
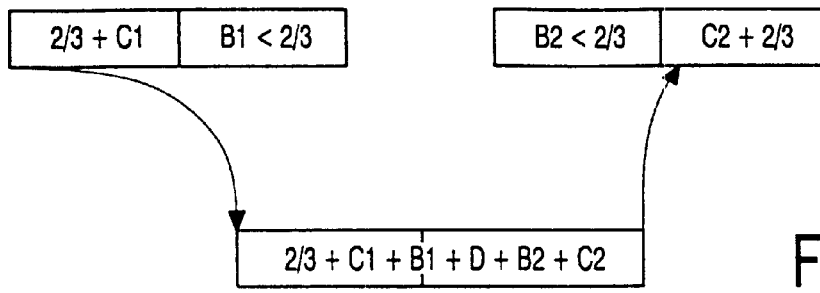

This data can be re allocated as two fragments as show in FIG. 32.

Now the second situation [25] is discussed. This will only cause a problem in the case where:

$$1<B1+D+B2+<4/3 \qquad [28]$$

Again all or part of C1 and C2 can be added to make the total at least 4/3 and so there is a problem if.

$$1<C1+B1+D+B2+C2<4/3 \qquad [29]$$

In this case adding the previous or next fragment gives:

$$5/3<2/3+C1+B1+D+B2+C2<6/3 \qquad [30]$$

The data in this case can be allocated as two fragments as shown in FIG. 10.

If the original stream was locally FF then C1=1/3 and C2=1/3 and in the first situation [24] a single fragment is sufficient for the bridge. In the second situation [25], two fragments are still required for the bridge.

Figure 34:
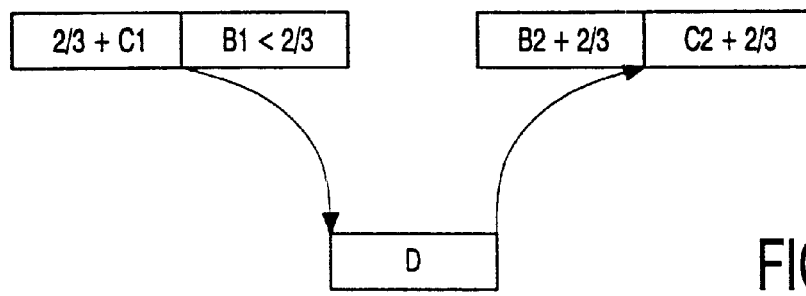

FIG. 34 shows the starting point for case 3. Here the fragment before the bridge is less than 2/3 full and the fragment after the bridge is greater the 2/3 full.

If $$2/3 \leq B1+D+B2 \qquad [34]$$

and $$B1+D \leq 1 \quad [35]$$

then there is no problem and a single fragment can be used for the bridge. There are two cases to consider:

$$B1+D+B2<2/3 \quad [36]$$

and $$1<B1+D<4/3 \quad [37]$$

Now in the first case [36] adding the rest of the fragment after the bridge gives:

$$2/3<B1D+B2+2/3<4/3 \quad [38]$$

There is a problem if:

$$1<B1+D+B2+2/3<4/3. \quad [39]$$

Some or all of C1 and C2 can be added to ensure that the data can fill two fragments, so there is still a problem if:

$$1<C1+B1+D+B2+2/3+C2<4/3 \quad [40]$$

Adding the rest of the previous or next fragment gives:

$$5/3<2/3+C1+B1+D+B2+2/3+C2<6/3 \quad [41]$$

Figure 35:
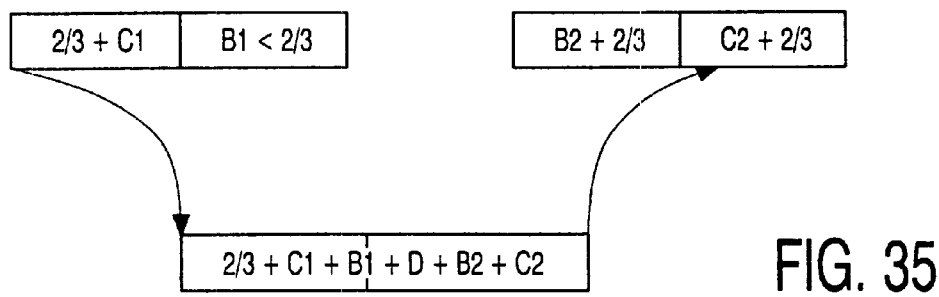

This data can be reallocated to two fragments as shown in FIG. 35.

Next the second case [37] will be considered. Adding B2 is possible but there is still a problem if:

$$1<B1+D+B2<4/3 \quad [42]$$

Adding the rest of the fragment after the bridge gives:

$$5/3<B1+D+B2+2/3<6/3 \quad [43]$$

Figure 36:
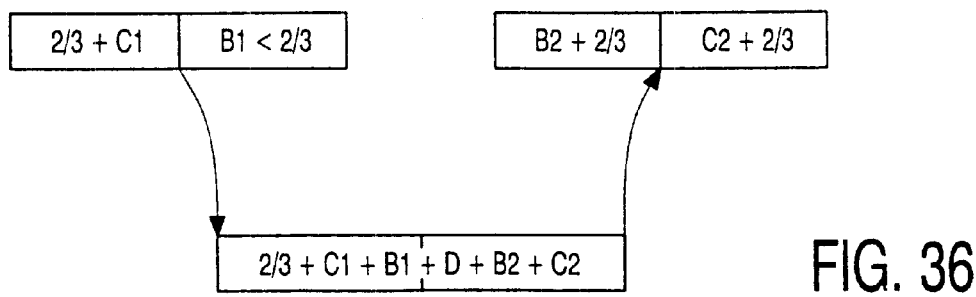

This data can be reallocated to two fragments as shown in FIG. 36. The bridge will still require two fragments even if the original stream was locally FF.

Concluding, it is possible to replace the HF condition with a condition where the minimum fragment fullness is 2/3 of a full fragment. This requires a maximum of two fragments for a bridge. Editing from a locally FF stream will still require two fragments for a bridge in some case.

Whilst the invention has been described with reference to preferred embodiments thereof, it is to be understood that these are not limitative examples. Thus, various modifications may become apparent to those skilled in the art, without departing from the scope of the invention, as defined by the claims. The disclosed fragment size of 4 MB is characteristic of one specific embodiment. Another embodiments may use other fragment sizes, such as 6 MB for example. Further, in this respect, it should be noted that first generation apparatuses in accordance with the invention, capable of carrying out recording and reproduction of a real time information signal, may be capable of recording signal blocks of fixed size SFA in the fragment areas only, whilst they are already capable of reproducing and processing signal blocks of variable size from the fragment areas in order to reproduce a real time information signal from a record carrier that has signal blocks of variable size stored in the fragment areas. Second generation apparatuses that are moreover capable of carrying out an editing step, will be capable of recording signal blocks of variable size in the fragment areas.

Further, the invention lies in each and every novel feature or combination of features. The invention can be implemented by means of both hardware and software, and that several "means" may be represented by the same item of hardware. Furthermore, the word "comprising" does not exclude the presence of other elements or steps than those listed in the claims.

What is claimed is:

1. Apparatus for recording, comprising:
   input means for receiving a real-time information signal;
   signal processing means for converting the information signal into blocks of information of a channel signal such that:

$$SFA/2 \leq \text{the size of a block of the channel signal} \leq SFA;$$

where SFA equals a fixed-size of a fragment area; and
   writing means for writing the channel signal in fixed-size fragment areas of a data recording portion of a disk-like record carrier.

2. The recording apparatus of claim 1, in which the signal processing means convert the information signal into blocks of information of the channel signal, such that in the blocks of information of a consecutive sequence satisfy alternately:

$$SFA/2 \leq \text{the size of a block of the channel signal} \leq SFA;$$

and $$\text{the size of a block of the channel signal} = SFA.$$

3. The recording apparatus of claim 1, in which the signal processing means convert the information signal into the blocks of information of the channel signal, such that the blocks of information of a consecutive sequence satisfy:

$$2*SFA/3 \leq \text{the size of a block of the channel signal} \leq SFA.$$

4. The recording apparatus of claim 1 in which the size of the blocks of information varies.

5. The recording apparatus of claim 1, where SFA equals 4 MB.

6. Apparatus for editing, comprising:
   input means for receiving an exit position in a first real-time information signal recorded on record carrier and for receiving an entry position in a second information signal, which may be the first information signal, recorded on the record carrier;
   means for storing information relating to the the exit and entry positions;
   bridging block generating means for generating at least one bridging block of information that includes information from at least one of the first and second information signals, which information is located before the exit position in the first information signal and/or after the entry position in the second information signal, and where $$SFA/2 \leq \text{the size of a bridging block of information} \leq SFA;$$

where SFA equals a fixed-size of fragment areas;
   writing means for writing the at least one bridging block of information into a corresponding fragment area of a data recording area of a disk-shaped record carrier; and
   means for the reading the information blocks from the record carrier and converting the information blocks including the bridging block into an edited stream of information.

7. The editing apparatus of 6, in which the bridging block generating means generate a consecutive sequence of a maximum of three bridging blocks of information alternately satisfying:

$$SFA/2 \leq \text{the size of a block of the channel signal} \leq SFA;$$

and $$\text{the size of a block of the channel signal} = SFA.$$

8. The editing apparatus of claim 6, in which the bridging block generating means generate a consecutive sequence of a maximum of two bridging blocks of information alternately satisfying:

$$2*SFA/3 \leq \text{the size of a block of the channel signal} \leq SFA.$$

9. The recording editing of claim 6, in which the size of the blocks of information varies.

10. The editing apparatus of claim 6, wherein, when the amount of information in a first fragment area of the first information signal that includes the exit position, from the beginning of the block of information in that fragment area to the exit position is smaller than SFA/2, then the bridging block generating means generate the bridging block of information from the information in the first fragment preceding the exit position and the information stored in a second fragment area, directly preceding the first fragment area in the first information signal.

11. The editing apparatus of claim 10, wherein:

the final position of the signal block in a third fragment area directly preceding the second fragment area in the first information signal is the new exit position from the first information signal, when reproducing the edited stream of information by the apparatus; and the editing apparatus further comprising means for storing information relating to the the new exit position.

12. The editing apparatus of claim 6, wherein, when the amount of information in a first fragment area of the second information signal that includes the entry position, from the entry position to the end of the block of information in that fragment area is smaller than SFA/2, then the bridging block generating means generate the bridging block of information from the information in the first fragment area following the entry position and at least a start portion of information stored in a second fragment area, directly following the first fragment area in the second information signal, such that the requirement for the size of the bridging block of information is met.

13. The editing apparatus of claim 12, wherein:

$$SFA/2 \leq \text{the size of remaining portion of information in the second fragment area} \leq SFA;$$

the boundary between the remaining portion of information and the start portion of information in the second fragment area is the new entry position into the second information signal, when reproducing the edited stream of information by the apparatus; and the editing apparatus further comprising means for storing information relating to the new entry position.

14. The editing apparatus of claim 6, wherein, when the amount of information in a first fragment area of the second information signal that includes the entry position, from the entry position to the end of the block of information in that fragment area is smaller than SFA/2, the bridging block generating means generate the bridging block of information from the information in the first fragment area following the entry position and the information stored in a second fragment area, directly following the first fragment area in the second information signal.

15. The editing apparatus of claim 14, wherein:

the start position of the signal block in a third fragment area directly following the second fragment in the second information signal is the new entry position into the second information signal, when reproducing the edited stream of information by the apparatus; and the apparatus further comprising means for storing information relating to the the new entry position.

16. The editing apparatus of claim 6, wherein, when the amount of information in a first fragment area of the first information signal that includes the exit position, from the beginning of the block of information in that fragment area to the exit position is smaller than SFA/2, then the bridging block generating means generate the bridging block of information from the information in the first fragment area preceding the exit position and at least a portion of the information stored in a second fragment area of the second information signal that includes the entry position, the portion extending from the entry point in the direction of the end position of the second fragment area, such that the requirement for the size of the bridging block of information is met.

17. The editing apparatus of claim 16, wherein the bridging block of information includes the information in the first fragment area preceding the exit position and only a portion of information of the second fragment area, such that, the requirement for the size of the portion of information in the second fragment area following the portion stored in the bridging block is also met.

18. The editing apparatus of claim 16, wherein:

the end position of the signal block included in a third fragment area directly preceding the first fragment area in the first information signal is the new exit position from the first information signal, when reproducing the edited stream of information by the apparatus; and the editing apparatus further includes means for storing the new exit position.

19. The editing apparatus of claim 16, wherein:

the start position of the signal block included in a fourth fragment area directly following the second fragment area in the second information signal is the new entry position into the second information signal, when reproducing the edited stream of information by the apparatus; and the editing apparatus further includes means for storing the new entry position.

20. The editing apparatus of claim 17, wherein:

the start position of the portion of information in the second fragment area that follows the portion stored in the bridging block is the new entry position into the second information signal, when reproducing the edited stream of information by the apparatus; and the apparatus further includes means for storing the new entry position.

21. The editing apparatus of claim 6, wherein, when the amount of information in a first fragment of the second information signal that includes the entry position, from the entry position to the end of the block of information in that fragment area is smaller than SFA/2, then the bridging block generating means generate the bridging block of information from the information in the first fragment area following the entry position and at least a portion of the information stored in a second fragment of the first information signal that includes the exit position, the portion extending from the exit point in the direction of the start position of the signal block in the second fragment area, such that the requirement for the size of the bridging block of information is met.

22. The editing apparatus of claim 21, wherein the bridging block of information includes the information in the first fragment area following the entry position and only a portion of information of the second fragment area, such that, the requirement for the size of the portion of information in the second fragment area preceding the portion stored in the bridging block is also met.

23. The editing apparatus of claim 6, where SFA equals 4 MB.

24. The editing apparatus of claim 21, wherein:
the end position of the signal block included in a fourth fragment area directly preceding the second fragment area in the first information signal is the new exit position from the first information signal, when reproducing the edited stream of information by the apparatus; and
the editing apparatus further includes means for storing the new exit position.

25. The editing apparatus of claim 22, wherein:
the end position of the portion of information in the second fragment area that precedes the portion stored in the bridging block is the new exit position from the first information signal, when reproducing the edited stream of information by the apparatus; and
the editing apparatus further includes means for storing the new exit position.

26. The editing apparatus of claim 6, further comprising:
means for decoding a portion of the information in the first information signal before the exit point, for decoding a portion of the information in the second information signal after the entry point;
means for generating a composite signal derived from the decoded portions of the first and the second information signals;
means for encoding the composite signal;
means for accommodating the encoded composite signal in one or more bridging blocks of information fragments, in which:

$SFA/2 \leq$ the size of a bridging block of information of the encoded composite signal $\leq SFA$;

and
means for writing the bridging blocks of information including the encoded composite signal, into corresponding fragment areas.

27. The editing apparatus of claim 21, wherein:
the start position of the signal block included in a third fragment area directly following the first fragment area in the second information signal is the new entry position into the second information signal, when reproducing the edited stream of information by the apparatus; and
the editing apparatus further includes means for storing the new entry position.

28. The editing apparatus of claim 26 in which the size of the bridging blocks of information comprising the encoded composite signal varies.

29. The editing apparatus of claim 6, wherein, when the amount of information in a first fragment area of the first information signal that includes the exit position, from the beginning of the block of information in that fragment area to the exit position is smaller than SFA/2, then the bridging block generating means generate the bridging block of information from the information in the first fragment area preceding the exit position and at least a final portion of information stored in a second fragment area, directly preceding the first fragment area in the first information signal, such that the requirement for the size of the bridging block of information is met.

30. The editing apparatus of claim 29, wherein:

$SFA/2 \leq$ the size of remaining portion of information in the second fragment area $\leq SFA$;

the boundary between the remaining portion of information and the final portion of information in the second fragment area is the new exit position from the first information signal, when reproducing the edited stream of information by the apparatus; and
the editing apparatus further comprising means for storing information relating to the new exit position.

31. A method of recording, comprising:
receiving a real-time information signal;
processing the information signal into a channel signal for recording the channel signal on a disc-like record carrier, the processing includes converting the information signal into blocks of information of the channel signal;
writing the channel signal on the record carrier, the writing includes writing a block of information of the channel signal in a fragment area on the record carrier;
and wherein the processing further includes converting the information signal into blocks of information of the channel signal, such that:

$SFA/2 \leq$ the size of a block of the channel signal $\leq SFA$;

where SFA equals the fixed-size of the fragment area.

32. The recording method of claim 31, in which the converting includes converting the information signal into blocks of information of the channel signal, such that the blocks of information of a consecutive sequence satisfy alternately:

$SFA/2 \leq$ the size of a block of the channel signal $\leq SFA$;

and the size of a block of the channel signal$=SFA$.

33. The recording method of claim 31, in which the converting includes converting the information signal into the blocks of information of the channel signal, such that the blocks of information of a consecutive sequence satisfy:

$2*SFA/3 \leq$ the size of a block of the channel signal $\leq SFA$.

34. The method of recording of claim 31 in which the size of the bridging blocks of information comprising the encoded composite signal varies.

35. A method of editing, comprising:
providing a disc-like record carrier, a data recording portion of which is subdivided into fixed-sized fragment areas which contain corresponding blocks of information of a channel signal;
reading information blocks of the channel signal from the record carrier;

converting the information blocks into a first real-time information signal;

receiving an exit position in a first information signal; and receiving an entry position in a second information signal, which may be the first information signal;

storing information relating to the the exit and entry position;

generating at least one bridging block of information, which bridging block of information includes information from at least one of the first and second information signals, which information is located before the exit position in the first information signal and/or after the entry position in the second information signal, and where:

$SFA/2 \leq$ the size of a bridging block of information $\leq SFA$;

where SFA equals the fixed-size of the fragment areas;

writing the at least one bridging block of information into a corresponding fragment areas; and reading the information blocks from the record carrier including the bridging block and converting the information blocks including the bridging block into an edited real-time information signal.

36. The editing method of claim 35, in which the generating step includes generating a consecutive sequence of a maximum of three bridging blocks of information alternately satisfying:

$SFA/2 \leq$ the size of a block of the channel signal $\leq SFA$;

and the size of a block of the channel signal=$SFA$.

37. The editing method of claim 35, in which the generating step includes generating a consecutive sequence of a maximum of two bridging blocks of information alternately satisfying the following relation ship:

$2*SFA/3 \leq$ the size of a block of the channel signal $\leq SFA$.

38. The method of editing of claim 35 in which the size of the bridging blocks of information comprising the encoded composite signal varies.

39. A disc-like record carrier comprising:

a data recording portion;

fixed-sized fragment areas subdividing the data recording portion;

an information signal recorded on the record carrier in channel encoded form, the information signal being divided into blocks of information of the channel signal, the blocks of information of the channel signal being within the fragment areas, the size of the blocks of information stored in a corresponding fragment satisfying:

$SFA/2 \leq$ the size of a block of information of the channel signal $\leq SFA$;

where SFA equals the fixed-size of the fragment areas.

40. The carrier of claim 39, the size of a consecutive sequence of blocks of information satisfy alternately:

$SFA/2 \leq$ the size of a block of the channel signal $\leq SFA$;

and the size of a block of the channel signal=$SFA$.

41. The carrier of claim 39, the size of the blocks in a consecutive sequence of blocks of information satisfy:

$2*SFA/3 \leq$ the size of a block of the channel signal $\leq SFA$.

42. Apparatus for reading, comprising:

means for reading an information signal recorded in channel encoded form in a data recording portion of a disc-like record carrier, the data recording portion being subdivided into fixed-size fragment area, blocks of information of the channel encoded information signal being recorded in corresponding fragment areas and satisfy:

$SFA/2 \leq$ the size of a block of information of the channel signal $\leq SFA$;

where SFA equals the fixed-size of the fragment areas;

signal processing means for processing the blocks of information read from the fragment areas into portions of the information signal;

means for outputting the information signal.

43. The reading apparatus of claim 42 in which the size of the blocks of information varies.

* * * * *